US006330293B1

(12) United States Patent
Klank et al.

(10) Patent No.: US 6,330,293 B1
(45) Date of Patent: Dec. 11, 2001

(54) METHOD FOR RECEIVING MULTICARRIER DIGITAL SIGNALS

(75) Inventors: Otto Klank, Lehrte; Wolfgang Klausberger, Laatzen; Jürgen Laabs, Pattensen, all of (DE)

(73) Assignee: DeutscheThomson-Brandt GmbH, Villingen-Schwennigen (DE)

( * ) Notice: Subject to any disclaimer, the term of this patent is extended or adjusted under 35 U.S.C. 154(b) by 0 days.

(21) Appl. No.: 09/110,085

(22) Filed: Jul. 2, 1998

(30) Foreign Application Priority Data

Jul. 28, 1997 (EP) ................................................ 97112929

(51) Int. Cl.[7] .................................................. H04L 27/26
(52) U.S. Cl. .......................... 375/344; 375/343; 375/366; 375/368; 370/509
(58) Field of Search ..................................... 325/343, 344, 325/365, 368; 370/509, 510, 512, 203, 210; 708/404, 422

(56) References Cited

U.S. PATENT DOCUMENTS

| 5,550,812 | * | 8/1996 | Philips | 370/203 |
| 5,596,582 | * | 1/1997 | Sato et al. | 370/509 |
| 5,627,863 | * | 5/1997 | Aslanis et al. | 375/357 |
| 6,058,101 | * | 5/2000 | Huang et al. | 370/208 |
| 6,134,284 | * | 10/2000 | Chennakeshu et al. | 375/324 |
| 6,137,847 | * | 10/2000 | Stott et al. | 375/344 |

FOREIGN PATENT DOCUMENTS

| 44 03 408 C1 | 2/1995 | (DE) | H04L/5/02 |
| 562 422 A1 | 9/1993 | (EP) | H04L/27/00 |
| 653 858 A2 | 5/1995 | (EP) | H04L/5/06 |
| 786 889 A1 | 7/1997 | (EP) | H04L/27/26 |
| 97/07620 | 2/1997 | (WO) | H04L/27/26 |
| 97/26742 | 7/1997 | (WO) | H04L/27/26 |

* cited by examiner

Primary Examiner—Young T. Tse
(74) Attorney, Agent, or Firm—J. S. Tripoli; E. P. Hermann

(57) ABSTRACT

Coarse symbol synchronization is carried out during reception, for tuning, the signal being correlated in the time domain with various copies of itself which are shifted in time and correspond to the possible transmission modes. The present mode, the present guard interval and a sampling window are derived from this.

14 Claims, 1 Drawing Sheet

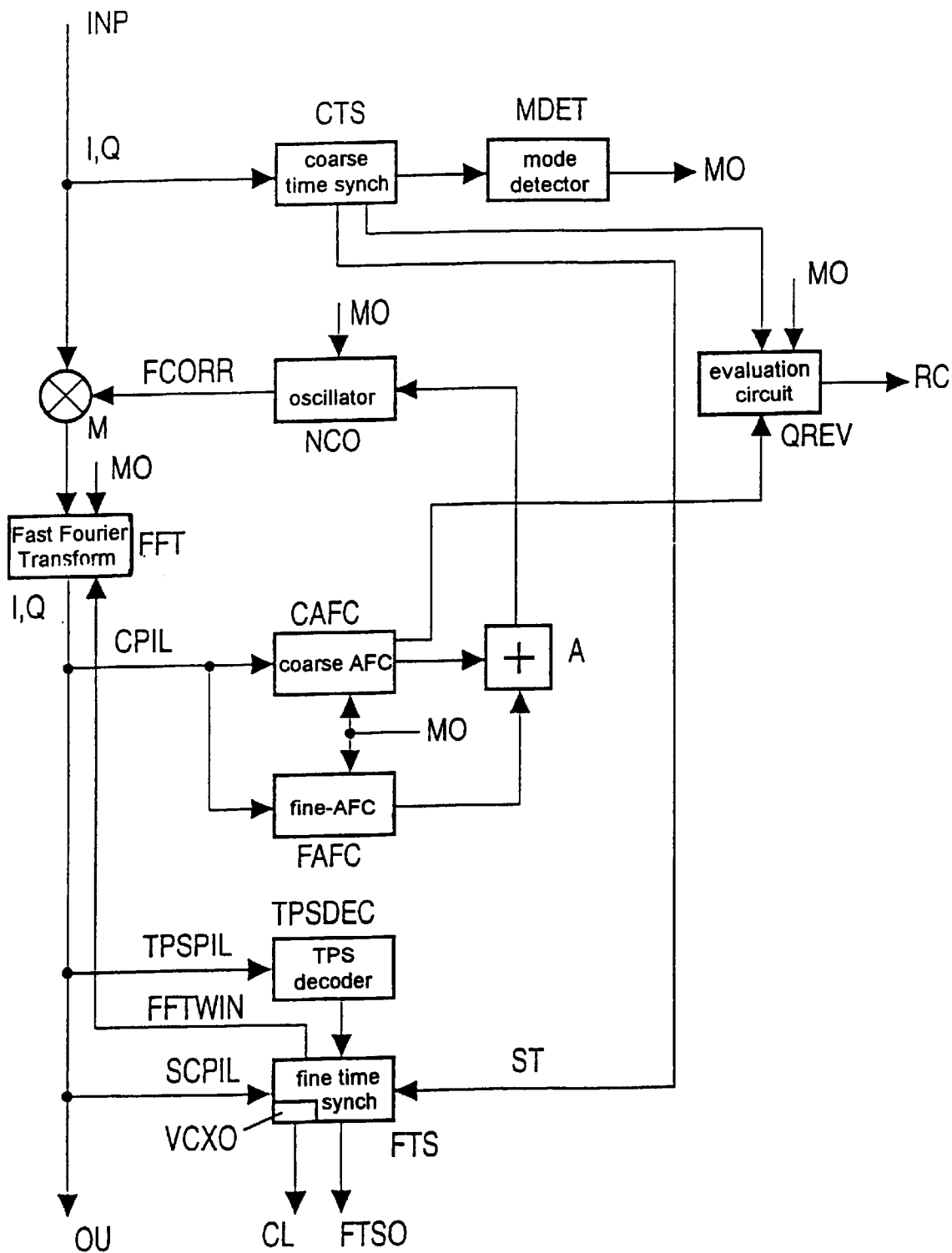

US 6,330,293 B1

METHOD FOR RECEIVING MULTICARRIER DIGITAL SIGNALS

FIELD OF THE INVENTION

The invention relates to a method and a receiver for receiving multicarrier digital signals.

BACKGROUND OF THE INVENTION

Modulation types such as OFDM, QPSK and QAM can be used for terrestrial transmission of digital television and broadcast radio signals (referred to in general as broadcast radio signals in the following text). Examples of such broadcast radio signals include DVB (digital video broadcast), HDTV-T (hierarchical digital television transmission) and DAB (digital audio broadcast). The fundamental principles of the DVB system are specified in ETS 300 744.

The data in digital broadcast radio signals are arranged in two-dimensional (time and frequency, called "temporal-spec-tral" in the following text) frames which have a time duration of TF and, in the case of ETS 300 744, comprise 68 OFDM symbols. Four frames form a superframe. Various transmission modes may be used in the transmission systems for digital audio or video signals mentioned above. In the case of ETS 300 744, symbols of duration Ts are in each case formed from 1705 carriers (2K mode) or from in each case 6817 carriers (8K mode) at different frequencies.

The 2K mode is particularly suitable for individual transmitters and small SFN networks (single frequency networks) with limited distances between transmitters.

The 8K mode can be used for individual transmitters and for small and large SFN networks.

The symbols have a time duration of Ts with a wanted part of duration Tu and a guard interval of duration $\Delta$. The guard interval is formed by cyclic continuation of the wanted part, and is arranged before the latter, in time. All symbols contain data and reference information. Each symbol may be regarded as a group of cells, one cell corresponding to each carrier.

Apart from the actual video, audio or other data, the frames contain scattered pilot cells (scattered pilots) continuous pilot signals and TPS carriers or pilots (transmission parameter signaling). These are described, for example, in Sections 4.4 to 4.6 of ETS 300 744, March 1997.

The pilot cells or carriers contain reference information whose transmitted value is known by the receiver. The continuous pilot signals may coincide with a scattered pilot cell, for example in every fourth symbol. The value or contents of the scattered and continuous pilot signals are derived, for example, from a pseudo-random binary sequence $W_k$ for each of the transmitted carriers k. The sequence $W_k$ may also define the start phase of the TPS carrier information. The pilot cells or carriers may be used at the receiver end for frame synchronization, frequency synchronization, time synchronization, channel estimation and transmission mode identification. The receiver manufacturer is free to chose whether and how these options are used at the receiver end.

EP-A-0 786 889 describes a corresponding system for use with DAB.

SUMMARY OF THE INVENTION

An important consideration in the context of such systems is to find a system-conformal signal in the situation where a receiver is switched on or is tuned into another channel. To do this, the receiver has to be able to distinguish between different services, for example to distinguish digital signals from analogue signals or digital DVB signals from digital DAB signals. Both digital signals and analogue signals (for example PAL television signals) may occur in certain frequency bands, in which case the center frequencies may differ from the specified channel mid-frequencies.

The invention is based on an improved method for tuning when receiving multicarrier digital signals, or for checking the system conformity of such received digital signals.

At the receiver end, coarse time synchronization linked to mode detection and, possibly and additionally, coarse AFC (automatic frequency correction) are carried out initially both for searching for and identifying received signals, as well as for continuously monitoring them.

In coarse time synchronization, the time signal is correlated with the time signal shifted by a wanted symbol length Tu. This correlation may be carried out more than once, for example five times per data frame. In this correlation, signal samples of different length Tu are used, depending on the respective mode, and the correlation result maxima obtained from this are then used to deduce the present mode (for example 2K or 8K modes). If no usable correlation result maximum is obtained, the correlation steps may be repeated.

The guard interval used is determined, and a sampling window is then positioned, based on the interval between the maxima and/or their amplitudes, taking account of the mode. This can be done by once-off setting of a counter which is synchronized to the symbol sequence (Tu+$\Delta$) and outputs a time window of duration Tu. In the following text, this time window is also called the sampling window or FFT window. A basic oscillator used in this case, and thus the position of the window as well, are corrected in subsequent steps via fine time synchronization.

Once the mode has been identified correctly and the sampling window has been positioned approximately correctly, an FFT can be carried out, with a length corresponding to the mode. Instead of an FFT, the invention, in an entirely general form, allows the use of a Fourier transformation or any other transformation which allows frequency-spectral representation of the time domain in the frequency domain. Once the signal has been converted in this way, pilot cells are taken from it in accordance with the intended arrangement layout, and are correlated with the values provided in accordance with the specification. According to the specification, 45 spectrum positions in the case of the 2K mode and 177 spectrum positions in the case of the 8K mode, for example, are occupied by continuous pilot signals. For example, ±16 such sets (over ±16 carrier intervals) are used for correlation in the 2K mode, and ±64 such sets (over ±64 carrier intervals) in the 8K mode. The correlation steps carried out provide a correlation maximum and, possibly, a number of secondary maxima of lower amplitude in the immediate vicinity. The frequency offset of the baseband signal can be determined from the position of the maximum. This result is used for coarse correction of the frequency, for example by means of a multiplier M arranged upstream of the FFT section, so that the frequency error for further steps is less than ±1/2 carrier interval.

However, it is a precondition that the position of the maximum was known in advance with sufficient reliability and an accuracy of better than ±1/2 carrier interval. The following calculation can be carried out in order to estimate the position $1_{real,s}$ of the maximum more accurately:

$$1_{real,s}=1_{max,s}+W_{1max,s,1}/(W_{1max,s}+W_{1max,s,1})*\text{sgn}(1_{max,s,1}-1_{max,s}),$$

where "sgn" is the mathematical sign of the position difference, the greatest maximum has the value $W_{1max,s}$ and is located at the position $1_{max,s}$, and the next smaller maximum value (of the same polarity) is designated $W_{1max,s,1}$ and is located at the position $1_{max,s}+1$ or $1_{max,s}-1$, designated $1_{max,s,1}$.

These calculations can be simplified by using the two values—the maximum and the next smaller maximum—in the sequence of the 1 values. The possible positions are then designated $1_{1,s}$ (the first position) and $1_{2,s}$, in which case the maximum may occur either at $1_{1,s}$ or at $1_{2,s}$. The mathematical sign function then disappears:

$$1_{real,s}=1_{1,s}+W_{12,s}/(W_{11,s}+W_{12,s}).$$

A plurality of such results (obtained successively in time), preferably three, may be combined, filtered or processed together in order to improve the AFC. The next frequency evaluation may be carried out at a greater interval, for example a total of 3 to 6 evaluations may be carried out per frame for the purpose of synchronization monitoring, in order to keep the computation complexity within reasonable orders of magnitude.

The intermediate value or more accurate value of the error determined in this way has already been taken into account in the frequency correction described above. Coarse frequency setting with a better accuracy than ±1/2 carrier interval ($-F_s/2<\Delta f <F_s/2$) is the precondition for the following acceptance of the AFC function by the so-called fine control system.

The achieved accuracy once the coarse setting has been carried out can be determined by checking the frequency once again. In this case, the result should be $-F_s/3<\Delta f<F_s/3$. If this is not achieved, or if the subsequent fine correction leads to a situation in which further signal processing (decoding) is impossible, then the processes described above must be repeated using a position offset by one carrier interval (in the direction of the side with the next lower correlation result, or possibly a correlation result of equal magnitude).

Specific evaluations are carried out after the coarse time synchronization and/or the coarse AFC. Both the values from the time correlation and those from the correlation over frequency are (in each case) used to form a ratio from the determined value of the maximum (or center value for the time correlation) and the average value of the other correlation partial results which are not associated with the maximum or the center region.

The results of the time correlation can be used, for example, to extract a region of duration Tu, although the maximum need not necessarily be in the center of this region. A region with a duration of ±1/2 guard interval duration must be separated out for calculating the average value. The center of the central region may be determined, for example, by determining the −6 dB points and calculating a mid-position. This advantageously reduces the influence of noise and multipath effects.

The entire range of ±16 individual steps (for the 2K mode) or ±64 individual steps (for the 8K mode) is used, for example, for evaluating the correlation partial results determined over the frequency. Once again, the main maximum may be located away from the center, and secondary maxima may be present at a greater distance. Secondary lines may likewise exist in the region $\pm F_s$ around the main maximum, but these should be regarded as part of the main maximum and occur as a result of an error in the signal position from the grid $F_s$ in the order $-F_s/2 \leq \Delta f \leq F_s/2$. For evaluation, it is thus recommended that the maximum value of the main maximum and the adjacent next smaller value be combined.

The average value $C_{av}$ is calculated, for example, as the mean square of all the correlation partial results which are not associated with the main maximum or the central region:

$$C_{av} = \sqrt{\left(\left(\sum_{0}^{l_1}|W_1|^2 + \sum_{l_2}^{l_{max}}|W_1|^2\right)\bigg/(l_1+l_{max}-l_2+2)\right)'},$$

where the region $1_1+1$ to $1_2-1$ relates to the part removed. In the case of complex partial results ($W_1$), the sum of the squares of the real and imaginary parts may also be formed, instead of forming the magnitude. For practical reasons, further simplifications are possible, for example, by rearranging the formula and with correspondingly changed minimum values, multiplications may be carried out instead of the division and calculation of the square root, that is to say squaring of the maximum values and multiplication by the divisor used in the formula. In good signal conditions and where the requirements for the quality of the statement are less stringent, it may be sufficient to calculate only the simple mean value. It is furthermore possible to compare the correlation partial results individually with a limit value derived from the maximum value (or from the sum of the maximum value and the adjacent next smaller value) and to use this to derive statements relating to the correlation result overall. This is possible when, in general, it is possible to ensure an adequate interval between the maximum and the other partial results, as is the case for correlation over frequency.

A check is then carried out to determine whether the (first) ratio derived from the time correlation exceeds a previously specified first minimum value, and whether the (second) ratio derived from the correlation carried out over frequency exceeds a previously specified second minimum value. If at least the first ratio exceeds the minimum value or, optionally, if both ratios exceed the minimum values specified for them, then the received signal is regarded as being system-conformal. If at least one of the conditions is not satisfied, then the signal is regarded as not being system-conformal.

Depending on the result, a received signal is designated as being "system-conformal" and/or "present", or "not system-conformal" and/or "not present" during the search or during an attempt to receive a specific signal or while reception is taking place.

The checks carried out result in a high level of confidence in the outcome, and the probability of a false outcome is extremely low. This means that the next steps can be carried out selectively. If the result is negative (that is to say no system conformity) it is, for example, no longer necessary to start decoding the signal in order to check the conformity once again. This allows a large amount of time to be saved in signal search processes, and thus avoids unnecessary waiting time for the user of the receiver.

Thus, depending on the present designation status, during the search process or in the case of a received sample, either the further decoding of the signal is started, the search process is continued, or the "not present" information is output for the received sample.

If it is intended to continue the tuning process on the basis of the results described above, fine AFC may now be carried out. To this end, for example, the phase changes between in each case two successive symbols in the continuous pilot signals are determined continuously and individually, the results are averaged, the final result determined in this way is used to calculate a frequency error, and this frequency error is used to carry out a frequency correction of the signal before the FFT. The final results or frequency errors determined successively symbol-by-symbol can advantageously also be combined and filtered over a number of symbols.

Frame synchronization, fine time synchronization and sampling clock adjustment can then be carried out. This is done, for example, by time evaluation (pulse response) of the "scattered pilots" and corresponding correction of the sampling clock reference oscillator, a plurality of values following one another in time (once again) expediently being combined and filtered.

Even during normal reception, it is expedient to carry out the check of the coarse time and frequency synchronization (as described above) at certain intervals. This allows quick detection of a signal failure, deterioration in the reception conditions, or loss of synchronization in the receiver. The conditions for this are that $\Delta t$ and $\Delta f$ exceed the limit values, or the calculated ratios are less than the minimum values. The expression $\Delta t$ in this case means the error between the center of the pulse response and the nominal position.

Any necessary countermeasures can be initiated quickly. If one wished to derive the identification of such a state from the decoder processes (for example from a sharp rise in the error rate), then, under some circumstances, this would result in the loss of a very large amount of time.

In the case of synchronization monitoring or continuous monitoring of the signal or of reception, in the situation where the designation status changes to "not system-conformal", a monitoring or warning signal is emitted to the other parts of the receiver so that, in certain conditions—for example failure of a number of symbols—appropriate measures may be initiated, with respect to reproduced video and audio signals, such as "freezing" or molting of the last acceptable image and/or muting of the audio channel.

Further status messages, such as a continuously set error flag in the Viterbi decoder, may also advantageously be evaluated for identification and/or designation of the signal status during continuous operation.

One advantage of the invention is that the reliability of signal identification is considerably improved and the identification takes place at the earliest possible point within the signal decoding at the receiving end, and thus also at the earliest possible time, so that it is not necessary to initiate any interruptions in reproduction. On the other hand, however, an interruption that is absolutely essential takes place quickly. This allows unacceptable disturbances, such as the failure or the incorrect decoding of a number of pixel blocks, or even all the pixel blocks, in a frame as well as loud or abrupt interference noise in the audio, to be very largely avoided.

In principle, the method according to the invention consists in that, in order to receive multicarrier digital signals which are arranged in temporal-spectral frames, contain data symbols having a guard interval, a wanted symbol length Tu and reference information, and which can be transmitted in various types of modes, the following steps are carried out for tuning during reception or for checking the system conformity of the received signals:

coarse time synchronization in which the digital signal is correlated in the time domain with the digital signal shifted in time by various values of Tu corresponding to the possible modes, the present mode being determined from the position and the magnitudes of maxima of the correlation values and the present guard interval being determined from intervals between maxima of the correlation values and a sampling window, which results from this and has a length corresponding to Tu, then being set for transformation means and subsequent signal evaluation;

coarse AFC correction with the aid of multiplier means arranged upstream of the transformation means, and with the aid of coarse AFC means arranged downstream of the transformation means, information items (which correspond to the arrangement layout of the reference information items) relating to the present symbol being taken from the output signal of the transformation means and being correlated in the coarse AFC means with a defined data layout, the nature of this correlation being chosen in accordance with the present mode;

qualitative evaluation of the results of the coarse time synchronization and of the correlation results associated with the coarse AFC correction, in order to determine the system conformity and reception quality of the digital signals.

In principle, the receiver according to the invention for multicarrier digital signals which are arranged in temporal-spectral frames contain data symbols having a guard interval and a wanted symbol length Tu and reference information, and which can be transmitted in various types of modes, is provided with:

multiplier means and transformation means for the digital signal; coarse time synchronization means, in which, for tuning during reception or for checking the system conformity of the received signals, the digital signal is correlated in the time domain with the digital signal shifted in time by various values of Tu corresponding to the possible modes, the present mode being determined from the position and the magnitudes of maxima of the correlation values and the present guard interval being determined from intervals between maxima of the correlation values, and a sampling window, which results from this and has a length corresponding to Tu, then being set for transformation means and the subsequent signal evaluation;

coarse AFC means for multiplier means arranged upstream of the transformation means, in which coarse AFC means coarse AFC correction is carried out with the aid of information items (which correspond to the arrangement layout of the reference information items) of the present symbol, which information items are taken from the output signal of the transformation means and are correlated in the coarse AFC means with a defined data layout, the nature of this correlation being chosen in accordance with the present mode;

evaluation means for qualitative evaluation of the results of the coarse time synchronization means and the correlation results which are determined in the coarse AFC means and determine the system conformity and reception quality of the digital signals.

BRIEF DESCRIPTION OF THE DRAWINGS

An exemplary embodiment of the invention is described with reference to the drawing.

The sole figure is a block diagram of a portion of a receiver according to the invention.

DETAILED DESCRIPTION OF PREFERRED EMBODIMENTS

In the receiver according to the figure, coarse synchronization is initially carried out for the digital input signal INP, in coarse time synchronization means CTS. In this case, the time signal is correlated with the time signal shifted by the duration of one wanted symbol Tu, for example 2 to 5 times per data frame. During this correlation, samples of different length Tu are used, depending on the respective mode, and the filtered or averaged correlation result maxima obtained from this are then used in mode detector means MDET to deduce the present mode MO (for example 2K or 8K mode), for example by comparing the maxima with a stored threshold value. MDET emits corresponding mode information MO.

If no usable correlation result maximum is obtained, the correlation steps in CTS can be repeated. The interval between the correlation maxima is used by the CTS to determine the guard interval used, talking account of the mode, and subsequently to position a sampling window, for example for once-off setting of a counter, which is synchronized to the symbol sequence (Tu+Δ), in the CTS, which emits a time window of duration Tu, for example by means of a start signal ST which is fed to fine time synchronization means FTS. The position of the sampling window FFTWIN and of the sampling clock is corrected in the FTS by means of a basic oscillator VCX0 used for this purpose.

The input signal ANP, which consists of an I element a Q element, is multiplied in a multiplier M by a frequency correction signal FCORR which originates from an oscillator NCO. The output signal from M selected by FFTWIN is converted in Fast Fourier Transformation means FFT to the frequency domain and, finally, forms the output signal OU, which consists of an I element and a Q element.

If the mode has been correctly identified and the sampling window has been positioned approximately correctly, coarse AFC can be carried out by coarse AFC means CAFC. To this end, the intended continuous pilot signals CPIL of the present symbol in a data frame are taken from the output signal from the FFT and are correlated in the CAFC with a defined layout (45 positions for the 2K mode, 177 positions for the 8K mode), to be precise over ±16 shifts for the 2K mode and +64 shifts for the 8K mode. The type of correlation is chosen depending on the MO.

In order to improve the coarse AFC, a plurality of such results can be combined or processed together over a specific number of symbols, for example 3 to 10, for example by averaging, majority formation or low-pass filtering. The maximum of the correlation process or the magnitude derived in a corresponding manner from a plurality of such maxima results in the coarse frequency error $\Delta f = p'*F_s$ and is used as a control signal for the oscillator NCO. The next evaluation may be carried out after a certain interval, for example 3 to 6 times per frame. If $\Delta f$ is less than a predetermined value $D_{max}$ (for example $D_{max}=F_s/3$), the corresponding retained initially and a changeover can be made to fine AFC in a fine-AFC means FAFC, to which the intended continuous pilot signals CPIL of the present symbol are likewise fed. The output signals from the CAFC and FAFC are combined in a combiner A and are supplied as a common control signal to NCO.

The correlation results from the CTS and CAFC are evaluated qualitatively in an evaluation circuit QREV. QREV likewise receives the mode information MO for this purpose. The output signal RC from QREV then controls corresponding parts of the receiver.

After positioning of the sampling window and/or achieving $\Delta f<D_{max}$, the above mentioned conditions are checked at specific time intervals, for the purpose of synchronization monitoring. For example, if the result is negative 2 to 10 times, a restart is carried out using coarse time synchronization in the CTS.

Depending on the previous tuning result, the received signal is designated in the receiver as being "system-conformal" and/or "present" or "not system-conformal" and/or "not present". Depending on this present designation status, during the search process or in the case of a received sample, either the further decoding of the signal is initiated, or the search process is continued, or the information "not present" is output for the received sample.

If it is intended to continue the tuning process, fine AFC may now be carried out. To this end, the phase change in the continuous pilot signals CPIL is determined from symbol to symbol, and is averaged over all the pilot signals CPIL (45 for the 2K mode, 177 for the 8K mode). These mean values may be low-pass filtered and, since they are proportional to Δf, can likewise be fed to the oscillator NCO, for example by means of combination in A, but with a reduced gradient.

A frame synchronization and fine time synchronization or sampling clock adjustment, respectively, are then carried out in circuits TPSDEC, FTS and VCXO. This is done by evaluating the TPS pilot cells TPSPIL which are taken from the output signal in the FFT and are decoded in a TPS decoder TPSDEC. The output signal from the latter is likewise fed to the fine time synchronization means FTS and results in a corresponding correction of the basic oscillator VCXO in order to obtain the sampling clock CL, as well as correction of the position of the sampling window FFTWIN. The frame start (FTS output signal FTSO) and the position of the "scattered pilots" are determined with the aid of the sync sequence of the TPS pilot cells, by correlation. The sampling clock CL is fed to all the circuit parts illustrated in the figure The "scattered pilots" can be interpolated in time in the FTS such that every third carrier may be regarded as a "scattered pilot". The pulse response is determined on the basis of the "scattered pilots" interpolated over time, with the aid of division by the specified "scattered pilots" nominal values and inverse FFT.

The discrepancy between the center of the pulse response and a nominal position desired for optimum reception is then determined. This process is advantageously repeated 3 to 7 times per frame. The result is advantageously filtered block-by-block, and is then further-processed. The sampling clock reference oscillator VCXO in the FTS is then corrected from the magnitude and direction of the discrepancy determined in this way. This correction can also be carried out by means of the oscillator NCO and the multiplier M. The NCO may contain a digital PLL.

The invention may be used in DVB receivers or in receivers for comparable digital signals, such as DAB receivers as well. The indicated numerical values are then changed as appropriate, and the individual synchronization or checking steps are matched to the reference or synchronization data currently being transmitted in the frames. In the case of the DAB receiver, the method described in EP-A-0 786 889 (based on CAZAC symbols) can then be used instead of the coarse AFC correlation method (based on continuous pilot signals) described here. The qualitative evaluation of the achieved correlation results is essentially identical. The evaluations according to the invention are particularly advantageous in combined receivers (DAB and DVB-T, or digital and analogue).

What is claimed, is:

1. A receiver for multicarrier digital signals which are arranged in temporal-spectral frames and contain data symbols having a guard interval and a wanted symbol length Tu and reference information, and which may be transmitted in various transmission modes comprising:

a cascade connected multiplier and transformation circuitry for processing the multicarrier digital signals, an oscillator coupled to provide a signal of controlled frequency to said miltiplier;

coarse time synchronization circuitry for tuning during reception or for checking for conformity of received signals, by correlating the multicarrier digital signals in the time domain with the multicarrier digital signals shifted in time by various values of Tu corresponding to ones of possible transmission modes, a present transmission mode and a sampling window being determined from a position and magnitudes of maxima of correlation values, and a present guard interval being determined from intervals between maxima of the correlation values, said sampling window having a length corresponding to Tu, being set for transformation circuitry and subsequent signal evaluation;

coarse AFC circuitry responsive to signal output from said transformation circuitry, for performing coarse AFC of said controlled frequency applied to said multiplier with the aid of information items relating to a present symbol, which information items are taken from output signal provided by the transformation circuitry and which are correlated in the coarse AFC circuitry with a defined data layout, the form of correlation being chosen in accordance with the present mode;

evaluation means for qualitative evaluation of results of the coarse time synchronization circuitry and correlation results from the coarse AFC circuitry for determining conformity and reception quality of the multicarrier digital signals.

2. The receiver according to claim 1, wherein the information items include continuous pilot signals, scattered pilot cells and TPS pilot cells and, wherein continuous pilot signals of the present symbol provided at the output of the transformation circuitry are applied to the coarse AFC circuitry, for correlation in the coarse AFC circuitry with the defined data layout.

3. The receiver according to claim 1, including frame and sampling clock synchronization means, for performing fine time synchronization by evaluation of a synchronization sequence of TPS pilot cells provided from an output of the transformation circuitry, in order to determine frame position and positions of scattered pilot cells in a frame an error between a nominal value and the center of a pulse response obtained with the aid of the scattered pilot cells being evaluated in order to adjust a sampling clock.

4. A method for receiving multicarrier digital signals which are arranged in temporal-spectral frames containing data symbols having a guard internal, a wanted symbol length Tu, and reference information, and which may be transmitted in various transmission modes, comprising the steps of:

receiving said multicarrier digital signals;

coarsely synchronizing said multicarrier digital signals received signals;

correlating said multicarrier digital signals in the time domain with a plurality of reference signals each having a different symbol length Tu corresponding to respective possible transmission modes to generate correlation values;

determining the maxima of produced correlation values and a current transmission mode therefrom;

determining a sampling window from the current transmission mode;

selecting a signal processing mode corresponding to the current transmission mode and processing said multicarrier digital signals;

applying processed said multicarrier digital signals to a coarse AFC circuit for providing a frequency error signal and for frequency correcting coarse synchronization, said coarse AFC circuit correlating processed said multicarrier digital signals with a defined data layout chosen in accordance with the current transmission signal mode.

5. The method according to claim 4 further including:

checking coarse AFC detection at predetermined intervals after positioning of the sampling window or achieving a frequency error which is less than a threshold value; and, restarting the coarse synchronization if the frequency error is greater than said threshold value on more than one occasion.

6. The method set forth in claim 4, further including:

repeating the step of correlating said multicarrier digital signals and determining the current transmission mode if correlation result maxima are less than a threshold value.

7. The method set forth in claim 4, further including:

averaging and filtering a plurality of correlation results generated by the coarse AFC circuit, and using averaged and filtered correlation results to provide frequency correction.

8. The method set forth in claim 4, wherein the coarse AFC circuit provides a plurality of correlation values and generates a frequency error from said plurality of correlation values associated with a group of correlation maximum.

9. The method set forth in claim 4, further including:

evaluating signal quality from results of coarse AFC correlation; and determining whether further synchronizing search processes be initiated or signal be decoded.

10. The method set forth in claim 4, further including:

changing from coarse synchronization to fine synchronization if said frequency error signal is less than a defined first threshold.

11. The method set forth in claim 4, wherein the reference information in received said multicarrier digital signals includes continuous pilot signals, scattered pilot cells and transmission parameter signaling carriers (TPS), and wherein the coarse AFC circuit correlates processed continuous pilot cells with said defined data layout.

12. The method set forth in claim 11, further including:

extracting from processed said multicarrier digital signals, TPS signals and scattered pilot cells;

determining the position of a frame and of the scattered pilot cells using a correlation with said TPS signals, by a distance value between a desired value and the current center of a pulse response calculated with the aid of said scattered pilot cells;

adjusting a sampling clock using said distance value.

13. The method according to claim 12, wherein the scattered pilot cells are temporally interpolated in order to obtain said pulse response.

14. The method according to claim 12, further including:

determining the distance value more than once;

combining these results in order to form a final distance value.

* * * * *